May 5, 1936.  C. C. FARMER  2,039,713
EMPTY AND LOAD BRAKE
Filed Dec. 19, 1934
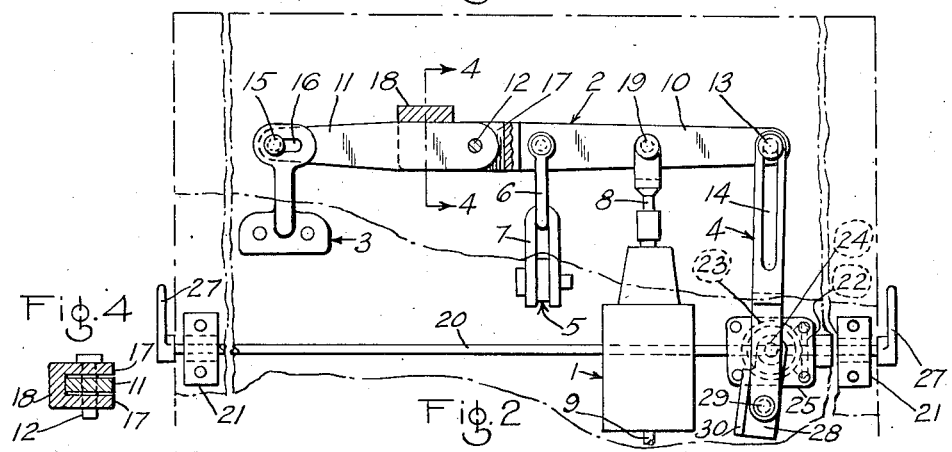
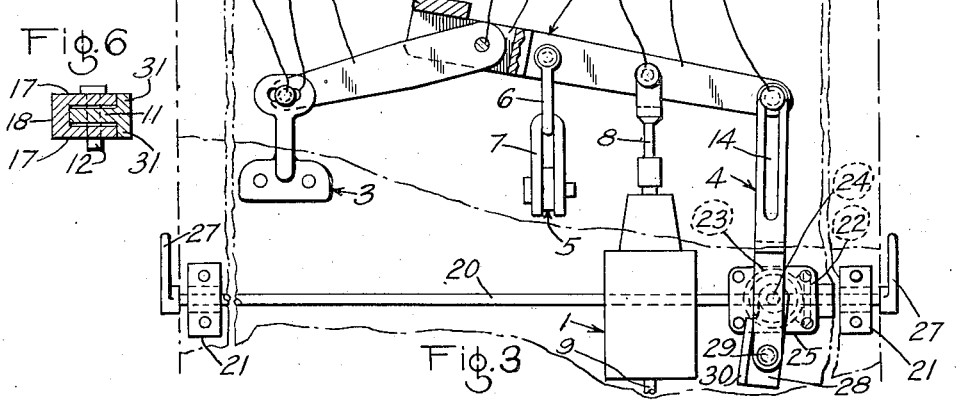
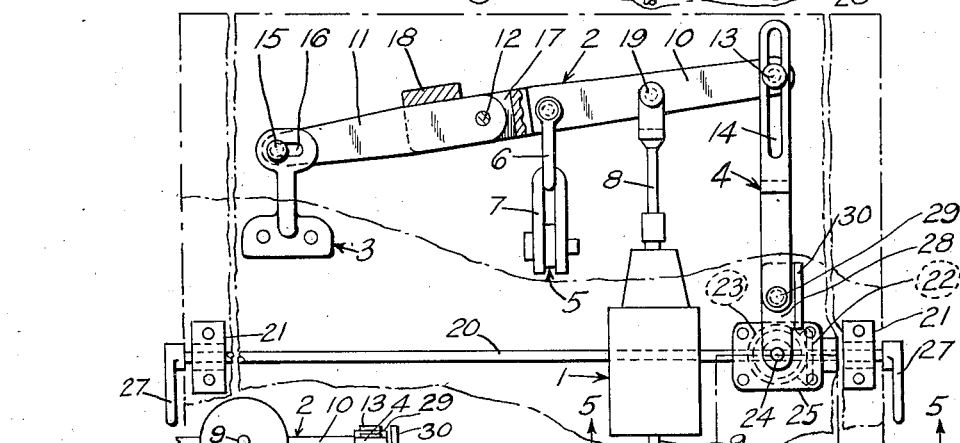
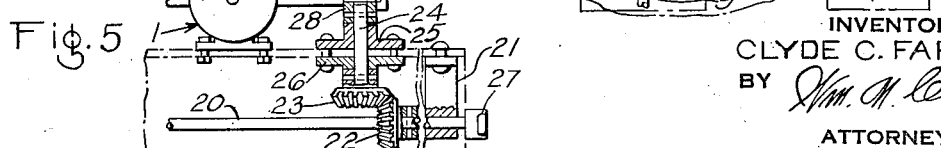
INVENTOR
CLYDE C. FARMER
BY *Wm. M. Cady*
ATTORNEY Patented May 5, 1936

2,039,713

UNITED STATES PATENT OFFICE 2,039,713

EMPTY AND LOAD BRAKE

Clyde C. Farmer, Pittsburgh, Pa., assignor to The Westinghouse Air Brake Company, Wilmerding, Pa., a corporation of Pennsylvania Application December 19, 1934, Serial No. 758,293

17 Claims. (Cl. 188—195)

This invention relates to mechanisms in which a power applying lever is employed and more particularly to an empty and load brake for railway vehicles.

In some types of railway vehicles, such as hopper cars and ore cars, the only available space for mounting the usual brake cylinder device and brake cylinder lever is that defined by the underside of the sloping end floor and the upper side of the underframe of the car. In many cases this space is so limited in the direction of the length of the car that when a horizontally disposed brake cylinder lever, of sufficient length to provide the desired empty or load braking action, is employed, one end of the lever may, in effecting an empty application of the brakes, move outwardly toward the end of the car so far as to be interfered with by the usual end framing members which rise from the underframe of the car or if not interfered with by the end framing members may be moved outwardly to a point beyond the end sill of the car.

The principal object of the invention is to provide an empty and load brake which will occupy a minimum amount of space in a direction longitudinally of a car without in any way sacrificing the efficiency of the brake and which will therefore entirely eliminate the above mentioned difficulties.

Another object of the invention is to provide a lever which when fulcrumed at one end will provide a certain leverage ratio and which when fulcrumed at the other end provides a different leverage ratio, and a further feature resides in the provision of means for selectively fulcruming one or the other of the ends of the lever.

Other objects and advantages will appear in the following more detailed description of the invention.

In the accompanying drawing, Fig. 1 is a plan view, partly in section, of an empty and load brake apparatus constructed in accordance with the invention, the several parts of the apparatus being shown in position for empty car service and the brakes released; Fig. 2 is a similar view but showing the several parts in the position they assume in effecting an application of the brakes; Fig. 3 is a view similar to Fig. 2 but showing the several parts of the apparatus conditioned for loaded car service and in the position they assume in effecting an application of the brakes; Fig. 4 is a detail fragmentary sectional view taken on the line 4—4 of Fig. 1; Fig. 5 is a fragmentary sectional view taken on the line 5—5 of Fig. 3 and Fig. 6 is a sectional view similar to Fig. 5 but illustrating a modification of the brake cylinder lever.

As shown in the accompanying drawing, the empty and load brake apparatus may comprise a brake cylinder device 1, a brake cylinder lever 2, a fixed fulcrum member 3 for one end of the brake cylinder lever, a movable fulcrum member 4 for the other end of the brake cylinder lever, a mechanism for actuating the movable fulcrum member 4, and a connection adapted to transmit braking power from the brake cylinder lever to a brake lever 5 and consequently to the usual brake shoes (not shown), said connection comprising a clevis 6 which is pivotally connected to the brake cylinder lever and a clevis 7 which is pivotally connected, at one end, to the clevis 6 and, at the other end to the brake lever 5.

The brake cylinder device 1 may be of the usual type having a cylinder portion which is secured to a fixed part of the car and which contains a piston (not shown) for controlling the operation of a push rod 8 to effect either the application or release of the brakes, said piston being movable to brake applying position by fluid under pressure supplied to the cylinder portion through the usual brake cylinder pipe 9 and being movable to brake releasing position upon the venting of fluid from the cylinder portion by way of the pipe 9.

The brake cylinder lever 2 comprises parts 10 and 11 which have their adjacent inner end portions pivotally connected together by means of a pin 12. The outer end of the part 10 is connected with the outer end of the movable fulcrum member 4 by means of a fulcrum pin 13, the fulcrum member being provided with a slot 14 through which the pin 13 passes, which slot, as will hereinafter appear, is adapted to permit movement of the brake cylinder lever relative to the fulcrum member when the apparatus is conditioned for load braking. The outer end of the part 11 is pivotally connected with the fixed fulcrum member 3 by means of a pin 15, said fulcrum member being provided with a slot 16 through which the pin 15 passes, which slot permits free movement of the part 11 when the apparatus is conditioned for empty braking and the lever is actuated in applying and releasing the brakes.

In the present embodiment of the invention the inner end portion of the part 10 is made in the form of a jaw having spaced upper and lower jaw portions 17 which at their outer edges are integrally connected together by a vertically disposed web 18. The inner end portion of the part

11 is received between the jaw portions 17, and as will hereinafter more fully appear, a portion of the front edge of the part is adapted to be engaged by the web 18 when the lever is in its normal release position as shown in Fig. 1 or when the lever is conditioned for load braking and is being actuated as shown in Fig. 3 to effect an application of the brakes.

The clevis 6 is connected to the part 10 at the right of the pin 12, and between this clevis and the movable fulcrum 4, the outer end of the push rod 8 is pivotally connected to the part 10 by means of a pin 19.

The mechanism for actuating the movable fulcrum member 4 may comprise a rotatable operating shaft 20 which extends from side to side of the car and which is suitably journalled in brackets 21 secured to rigid parts of the car. Secured to the shaft is a bevelled gear wheel 22 which meshes with a bevelled gear wheel 23 secured to the lower end of a vertically disposed rotatable shaft 24 journalled in bearing members 25 and 26 secured to a fixed part of the car. Each end of the shaft 20 is provided with an operating handle 27.

The upper end of the vertically disposed shaft 24 has secured thereto an operating arm 28 which is pivotally connected to the inner end of the movable fulcrum member 4 by means of a pin 29. This arm is provided with an upwardly extending flange 30 which, as will hereinafter appear, is adapted to cooperate with the fulcrum member 4, when the brake apparatus is conditioned for empty braking, to lock the member in its effective position as shown in Figs. 1 and 2 and to cooperate with the member, when the apparatus is conditioned for load braking, to prevent the arm 28 from being rotated in a counterclockwise direction when the apparatus is conditioned for load braking.

In operation when the apparatus is conditioned for empty braking, the fulcrum member 4 is locked in the position in which it is shown in Figs. 1 and 2. In this position the fulcrum pin 15 is in operative engagement, at the outer end of the slot 16, with the fulcrum member 4, and the flange 30 is in locking engagement with the left hand side of the fulcrum member 4. With the flange 30 in this position, the center of the connection between the arm 28 and the inner end of the member 4 is positioned to the left of the center of the shaft 24, so that the fulcrum member and arm are locked in position.

Now when fluid under pressure is supplied to the brake cylinder the push rod 8 is moved outwardly, causing the inner end of the part 10 of the brake cylinder lever to move in the arc of a circle about the fulcrum pin 13, causing braking power to be transmitted through the clevises 6 and 7 to the brake lever 5.

As the inner end thus moves, the inner end of the part 11 of the lever of course moves with it in the arc of a circle, the fulcrum pin 15 moves transversely of the fulcrum member 3 within the slot 16.

It will here be noted that, with the apparatus conditioned for empty braking, the only part of the lever which is effective to apply braking force to the brake lever 5 is the part 10, and since the outer end of the part 11 is connected to the fixed fulcrum 3, it is not permitted to move toward the end of the car. If the part 11 were integral with the part 10 the outer end of the lever would be liable to engage certain fixed parts of the end of the car when the apparatus is conditioned for empty braking and the brakes are being applied and therefore interfere with the proper operation of the apparatus, or might, in some cases, extend beyond the end of the car underframe. By securing the outer end of the part 11 to the fulcrum member 3 and hinging the inner end of the part to the inner end portion of the part 10, this difficulty is entirely eliminated.

When it is desired to change the apparatus over from its empty braking condition to its load braking condition, the operating shaft 20 is rotated in a clockwise direction by means of either of the operating handles 27, which, due to the meshing bevelled gears 22 and 23, causes the shaft 24, arm 28 and inner end of the fulcrum member 4 to be rotated in a counterclockwise direction from the position in which they are shown in Figs. 1 and 2 to the position in which they are shown in Fig. 3. This causes the fulcrum member 4 to be moved forwardly relative to the fulcrum pin 13 and brake cylinder lever a sufficient distance that when the brake cylinder lever is moved to effect an application of the brakes, the pin 13 will not form a fulcrum for the lever.

It will be noted that if the arm 28 should be rotated toward the left hand beyond the position in which it is shown in Fig. 3, the flange 30 thereof will engage the member 4 and bring the arm to a stop before the member 4 is caused to move inwardly any material distance from its outermost position, thus insuring the proper adjustment of the member 4.

Now when fluid under pressure is supplied to the brake cylinder the push rod 8 is moved outwardly, causing the brake cylinder lever to move in the arc of a circle about the fulcrum pin 15, the fulcrum pin 13 moving relative to the fulcrum member 4. It will be seen that with the right hand end of the brake cylinder lever free to move relative to the fulcrum member 4 and the pin 15 forming the fulcrum for the lever, the web 18 of the part 10 engages with the part 11, so that these parts function as an integral lever.

From an inspection of Fig. 3 of the drawing, it will be seen that with the apparatus conditioned for load braking, the free end of the lever will not be moved outwardly far enough to be interfered with by the vertically disposed end members of the car framing.

It is to be understood that instead of embodying the invention in a brake cylinder lever it may be embodied in any other lever having changeable fulcrums and where the available space for the mounting of the lever is so limited as to preclude the use of a lever of the proper length to provide the desired load braking action.

In Fig. 6 a modification of the invention is illustrated in which the inner longitudinal edge of the portion of the part 11 which extends between the jaw portions 17 of the part 10 is provided with vertically disposed lugs 31 which are adapted to engage the inner edges of said jaw portions when the apparatus is operated to effect a load application of the brakes, thus taking some of the strain which would otherwise be imposed on the web 18 only and thereby strengthening the operative connection between the parts 10 and 11.

From the foregoing description it will be seen that when the apparatus is conditioned for load braking, the leverage ratio of the lever 2 is greater than that of the lever when the apparatus is conditioned for empty braking.

While two illustrative embodiments of the invention have been described in detail, it is not my intention to limit its scope to these embodiments or otherwise than by the terms of the appended claims.

Having now described my invention, what I claim as new and desire to secure by Letters Patent, is:

1. In a variable power mechanism comprising a lever adapted to vary the power of the mechanism, said lever having a fulcrum at each of its ends, either of which is adapted to be rendered effective or ineffective, one of said fulcrums when effective providing a certain leverage ratio and the other of said fulcrums when effective providing a different leverage ratio, means operative to selectively render either one or the other of the fulcrums effective, and means for actuating said lever.

2. In a variable power mechanism comprising a lever adapted to vary the power of the mechanism, said lever having a fulcrum at each of its ends, either of which is adapted to be rendered effective or ineffective, one of said fulcrums when effective providing a certain leverage ratio and the other of said fulcrums when effective providing a different leverage ratio, a member movable into engagement with one of said fulcrums to render the other fulcrum ineffective and movable out of engagement therewith to render said other fulcrum effective, means for actuating said member, and means for actuating said lever.

3. In a variable power mechanism comprising a lever adapted to vary the power of the mechanism, said lever having a fulcrum at each of its ends, either of which is adapted to be rendered effective or ineffective, one of said fulcrums when effective providing a certain leverage ratio and the other of said fulcrums when effective providing a different leverage ratio, a member movable into engagement with one of said fulcrums to render the other fulcrum ineffective and movable out of engagement therewith to render said other fulcrum effective, means for actuating said member, power transmitting means operatively connected to said lever between the ends of the lever, and means for actuating said lever operatively connected to the lever intermediate one of its ends and the power transmitting means.

4. In a variable power mechanism comprising a lever adapted to vary the power of the mechanism, said lever having a fulcrum at each of its ends, either of which is adapted to be rendered effective or ineffective, one of said fulcrums when effective providing a certain leverage ratio and the other of said fulcrums when effective providing a different leverage ratio, a member movable into engagement with one of said fulcrums to render the other fulcrum ineffective and movable out of engagement therewith to render said other fulcrum effective, means for actuating said member, power transmitting means operatively connected to said lever between the ends of the lever and means for actuating said lever operatively connected to the lever intermediate the power transmitting means and the end of the lever nearest the power transmitting means.

5. In an empty and load brake apparatus, in combination, a lever having a substantially fixed fulcrum for one end of the lever and adapted to be actuated about the fulcrum to effect a load application of the brakes, a fulcrum for the other end of the lever, means operable to render the last mentioned fulcrum effective, said lever being adapted to be actuated about the last mentioned fulcrum to effect an empty application of the brakes, and means embodied in said lever providing for the movement of the lever about the last mentioned fulcrum.

6. In a variable power mechanism comprising a lever adapted to vary the power of the mechanism, in combination, a fixed fulcrum member to which one end of the lever is constantly attached a fulcrum member movable either into or out of fulcruming relation to the other end of the lever, means for actuating the lever, said lever comprising two parts hinged together between its ends to permit relative movement between the parts when the movable fulcrum member is in fulcruming relation to said other end of the lever and the lever is actuated, and means for preventing relative movement between said parts when the movable fulcrum member is out of fulcruming relation to said other end of the lever and the lever is actuated.

7. In a variable power mechanism comprising a lever adapted to vary the power of the mechanism, in combination, a fixed fulcrum member to which one end of the lever is constantly attached, a fulcrum member movable either into or out of fulcruming relation to the other end of the lever, means operative to apply power to the lever at a point adjacent said other end of the lever, means associated with said lever between the power applying means and the first mentioned end of the lever for transmitting power from said lever, said lever comprising two parts hinged together between its ends to permit relative movement between the parts when the movable fulcrum member is in fulcruming relation to said other end of the lever and power is applied to the lever, and means for preventing relative movement between the parts when the fulcrum member is out of fulcruming relation to said other end of the lever and power is applied to the lever.

8. In a variable power mechanism comprising a lever adapted to vary the power of the mechanism, in combination, a fixed fulcrum member to which one end of the lever is constantly attached, a fulcrum member movable either into or out of fulcruming relation to the other end of the lever, said lever comprising two parts hinged together between its ends to permit relative movement between the parts when the movable fulcrum member is in fuling relation to said other end of the lever and power is applied to the lever, means for preventing relative movement between the parts when the movable fulcrum is out of fulcruming relation to said other end of the lever and power is applied to the lever, means for applying power to said lever and means for transmitting power from said lever, the power applying means and the power transmitting means being operatively associated with the part of the lever with which the movable fulcrum member is adapted to co-operate.

9. In a variable power mechanism comprising a lever adapted to vary the power of the mechanism, in combination, a fixed fulcrum member to which one end of the lever is constantly attached, a fulcrum member movable either into or out of fulcruming relation to the other end of the lever, said lever comprising two parts hinged together to form an articulated joint between its ends to permit relative movement between the parts when the movable fulcrum member is in fulcruming relation to said other end of the lever and power is applied to the lever, means for preventing relative movement between the parts when the movable fulcrum is out of fulcruming relation to said other end of the lever and power is applied to the lever, means for applying power to said lever and means for transmitting power from said lever, the power applying means being operatively associated with the lever at a point between the ends of the part with which the movable fulcrum member is adapted to cooperate and the power transmitting means being operatively associated with the lever at a point between the power applying means and the joint between the parts of the lever.

10. In a variable power mechanism comprising a lever adapted to vary the power of the mechanism, in combination, a fixed fulcrum member to which one end of the lever is constantly attached, a fulcrum member movable either into or out of fulcruming relation to the other end of the lever, means for actuating the lever, said lever comprising two parts hinged together between its ends to permit relative movement between the parts when the movable fulcrum member is in fulcruming relation to said other end of the lever and the lever is actuated, and means on one of said parts adapted to engage the other of said parts for preventing relative movement between the parts when the movable fulcrum member is out of fulcruming relation to said other end of the lever and the lever is actuated.

11. In a variable power mechanism comprising a lever adapted to vary the power of the mechanism, in combination, a fixed fulcrum member to which one end of the lever is constantly attached, a fulcrum member movable either into or out of fulcruming relation to the other end of the lever, means for actuating the lever, said lever comprising two parts hinged together between its ends to permit relative movement between the parts when the movable fulcrum member is in fulcruming relation to said other end of the lever and the lever is actuated, and means for interlocking said parts together against relative movement when the movable fulcrum member is out of fulcruming relation to said other end of the lever and power is applied to the lever.

12. In a variable power mechanism comprising a lever adapted to vary the power of the mechanism, in combination, a fixed fulcrum member to which one end of the lever is constantly attached, a fulcrum member movable either into or out of fulcruming relation to the other end of the lever, means operative to apply power to the lever at a point adjacent said other end of the lever, means associated with said lever between the power applying means and the first mentioned end of the lever for transmitting power from said lever, said lever comprising two parts hinged together between its ends to form an articulated joint to permit relative movement between the parts when the movable fulcrum member is in fulcruming relation to said other end of the lever and power is applied to the lever, and means for preventing relative movement between the parts when the fulcrum member is out of fulcruming relation to said other end of the lever and power is applied to the lever, the last mentioned means being located between the joint in the lever and the end of the lever which is connected to the fixed fulcrum member.

13. In a brake mechanism, in combination, a brake lever adapted to be selectively fulcrumed at one or the other of its ends and adapted to be operated to effect an application of the brakes, said lever comprising two parts hinged together to permit relative movement between the parts when the lever is fulcrumed at one of its ends, and means for preventing relative movement between the parts when the lever is fulcrumed at the other of its ends.

14. In a brake mechanism, in combination, a brake lever adapted to be selectively fulcrumed at one or the other of its ends and adapted to be operated to effect an application of the brakes, said lever comprising two parts hinged together to permit relative movement between the parts when the lever is fulcrumed at one of its ends, and means on one of said parts adapted to engage with the other of said parts for preventing relative movement between the parts when the lever is fulcrumed at the other of its ends.

15. In a brake mechanism, in combination, a brake lever comprising two parts hinged together between the ends thereof, the end of the part which constitutes one end of the lever being constantly fulcrumed and the end of the part which constitutes the other end of the lever being adapted to be either fulcrumed or free to move, the hinged connection between the parts permitting the operation of the lever when said other end of the lever is fulcrumed, and means for preventing hinging action between the parts when said other end of the lever is free to move and the lever is actuated.

16. In a brake mechanism, in combination, a brake lever adapted to be selectively fulcrumed at one or the other of its ends and adapted to be operated to effect an application of the brakes, said lever comprising two parts hinged together to permit relative movement between the parts when the lever is fulcrumed at one of its ends, means for preventing relative movement between the parts when the lever is fulcrumed at the other of its ends, and means operative manually to selectively fulcrum the lever at one or the other of its ends.

17. In a brake mechanism, in combination, a brake lever comprising two parts hinged together between the ends thereof, the end of the part which constitutes one end of the lever being constantly fulcrumed and the end of the part which constitutes the other end of the lever being adapted to be either fulcrumed or free to move, a fulcrum member selectively movable either into or out of engagement with said other end of the lever, the hinged connection between the parts permitting the operation of the lever when said other end of the lever is fulcrumed to the movable fulcrum member, and means for preventing hinging action between the parts when the movable member is out of fulcruming relation to said other end of the lever.

CLYDE C. FARMER.